United States Patent
Shibata et al.

(10) Patent No.: US 7,893,864 B2
(45) Date of Patent: Feb. 22, 2011

(54) RADAR APPARATUS AND CONTROL METHOD OF THE SAME

(75) Inventors: Shinichi Shibata, Kobe (JP); Hideki Kajioka, Kobe (JP)

(73) Assignee: Fujitsu Ten Limited, Kobe (JP)

(*) Notice: Subject to any disclaimer, the term of this patent is extended or adjusted under 35 U.S.C. 154(b) by 0 days.

(21) Appl. No.: 12/537,707

(22) Filed: Aug. 7, 2009

(65) Prior Publication Data

US 2010/0033366 A1 Feb. 11, 2010

(30) Foreign Application Priority Data

Aug. 7, 2008 (JP) ................ 2008-204683

(51) Int. Cl.
*G01S 13/00* (2006.01)

(52) U.S. Cl. .................... 342/70; 342/122

(58) Field of Classification Search ....... 342/104–158; 356/3–5.15, 27–28.5; 73/1.79; 367/118–130
See application file for complete search history.

(56) References Cited

U.S. PATENT DOCUMENTS 6,072,422 A * 6/2000 Yamada .................. 342/70

2005/0174282 A1 * 8/2005 Nakanishi et al. .......... 342/109

FOREIGN PATENT DOCUMENTS

| JP | A-11-316273 | 11/1999 |
|---|---|---|
| JP | A-2000-065921 | 3/2000 |
| JP | A-2002-236170 | 8/2002 |
| JP | A-2003-121533 | 4/2003 |
| JP | A-2003-149325 | 5/2003 |
| JP | A-2003-167047 | 6/2003 |

* cited by examiner

*Primary Examiner*—Thomas H Tarcza
*Assistant Examiner*—Timothy A Brainard
(74) *Attorney, Agent, or Firm*—Oliff & Berridge, PLC

(57) ABSTRACT

A radar apparatus is provided. An antenna is configured to transmit a frequency-modulated transmission wave toward an object and receive a reception wave from the object. A mixer is configured to mix the transmission wave with the reception wave to generate a beat signal having a first beat interval and a second beat interval. A detecting section is configured to detect a plurality of first peak signals contained in the first beat interval of the beat signal and a plurality of second peak signals contained in the second beat interval. A grouping section is configured to group the second peak signals. A searching section is configured to search a part of the first peak signals corresponding to the grouped second peak signals. A separating section is configured to separate the part of the first peak signals from the other part of the first peak signals.

4 Claims, 12 Drawing Sheets

DOWNBEAT

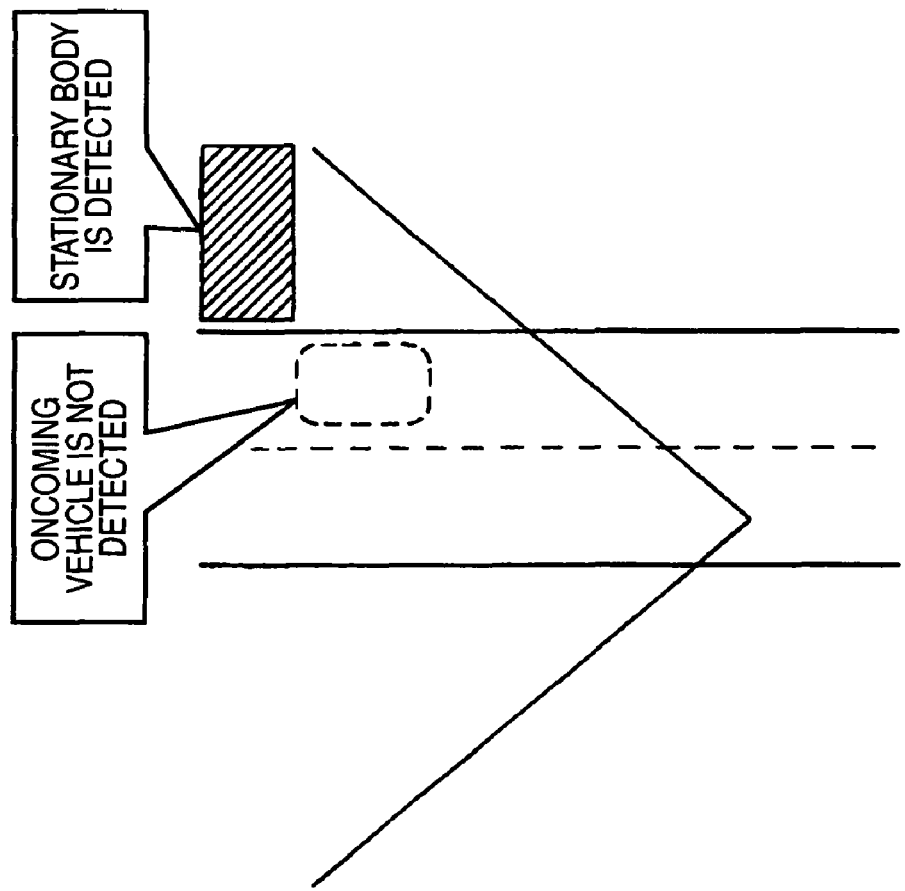
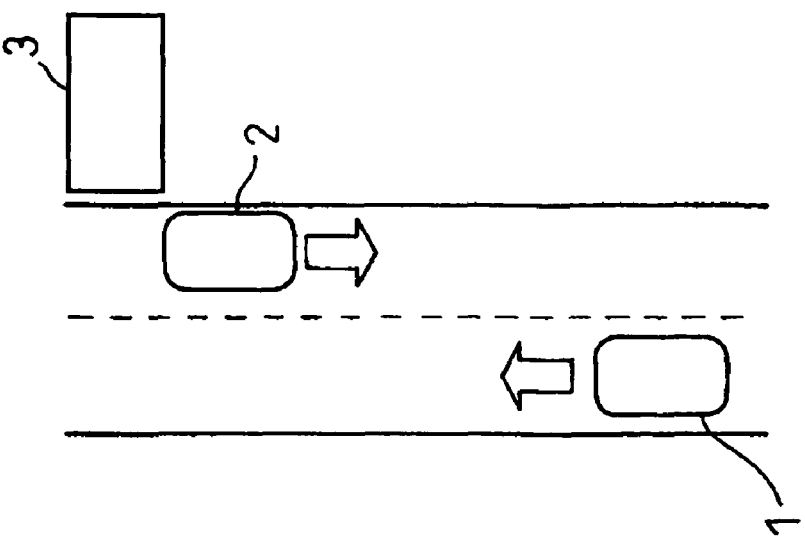

DOWNBEAT

UPBEAT

DIFFERENCE

RADAR APPARATUS AND CONTROL METHOD OF THE SAME

The disclosure of Japanese Patent Application No. 2008-204683 filed on Aug. 7, 2008 including specification, drawings and claims is incorporated herein by reference in its entirety.

BACKGROUND

The invention relates generally to a radar apparatus and a control method of the radar apparatus, in particular, to a radar apparatus capable of detecting an object with the use of a reflected wave from the object such as a vehicle or a stationary body, and a control method of the radar apparatus.

To improve vehicle safety and to realize comfortable driving, there is a call for high performance vehicles. In particular, in order to avoid contact with a preceding vehicle or a pedestrian disposed in the direction of travel, and to perform an automatic driving by following a preceding vehicle, an in-vehicle radar apparatus for detecting these objects is important.

As one of these in-vehicle radar apparatuses, there is a radar apparatus using an FM-CW (frequency-modulated continuous wave) radar system. In the FM-CW radar system, a base band signal with a triangle wave is applied with a voltage controlled oscillator (VCO), is frequency-modulated, and is transmitted ahead of the vehicle from an antenna. In this case, the radar apparatus controls the antenna to scan a predetermined angle area in front of the vehicle and to transmit a plurality of beams to the predetermined angle area at a predetermined interval. In addition, the radar apparatus receives the signal reflected from an object by the antenna, mixes the transmitted signal with the received signal, extracts respective peak signals for an upbeat and a downbeat, groups the respective peak signals, pairs the objects obtained by the grouping, and then calculates a distance and/or a relative velocity between the vehicle and the object (See Patent Document 1).

The radar apparatus disclosed in the patent document 1 predicts the current position of an object depending on the past pathway of the object, groups the peak signals based on the predicted position. By this past corresponding grouping, the radar apparatus is capable of detecting any peak signals even when some peak signals are covered.

In a signal processing device using the FM-CW radar system, when the numbers of the peak frequencies are different from each other for the upbeat and the downbeat, by setting the frequency in which power peaks within the peak width of the missing peak frequency as a peak frequency and setting the peak frequency for the upbeat equal to the peak frequency for the downbeat, the respective peak frequencies are paired therebetween (See Patent Document 2).

Patent Document 1: Japanese Patent Publication No. 2003-149325 A

Patent Document 2: Japanese Patent Publication No. 11-316273 A

However, when an object exists in the vicinity of a stationary body, it is not possible to easily and accurately detect the peak signals corresponding to the object since the peak signals corresponding to the object are covered by the wide skirt of the peak signals corresponding to the stationary body.

An exemplary case where the object exists in the vicinity of the stationary body will be described hereinafter.

FIG. 1A is a diagram illustrating an exemplary actual scene in which an oncoming vehicle 2 is disposed in the vicinity of a stationary body 3 and located in front of a driver's car 1, and FIG. 1B is a diagram illustrating an exemplary detection result thereof. FIG. 2A is a diagram illustrating a map of the peak signals for the upbeat in the FM-CW mode according to FIG. 1A, and FIG. 2B is a diagram illustrating a map of the peak signals for the downbeat in the FM-CW mode according to FIG. 1A.

Under the situation shown in FIG. 1A, a group 100 of beam signals 111 to 115 and a group 120 of beam signals 121 to 123 are formed in the map of the peak signals for the upbeat as shown in FIG. 2A. However, since the peak signals corresponding to the oncoming vehicle 2 are covered by the wide skirt of the peak signals corresponding to the stationary body 3, only one group 130 is formed in the map of the peak signals for the downbeat as shown in FIG. 2B. These events remarkably appear in a case where the reflectivity of the stationary body 3 is large, the maximum peak (for example, the peak signal 113) of the peak signals corresponding to the stationary body 3 is high, the reflectivity of the oncoming vehicle 2 is small due to its stream lined front surface and the maximum peak (for example, the peak signal 122) of the peak signals corresponding to the oncoming vehicle 2 is low.

Generally, in a stationary body determination process, if there is a group of peak signals for the downbeat, corresponding to the maximum peak of the group 100 for the upbeat, the group 110 and the group 130 are identified as the peak signals corresponding to the stationary body, and thus excluded from the other detection processes. Thus, the oncoming vehicle 2 is not identified, and as shown in FIG. 1B, the oncoming vehicle 2 is not detected.

FIG. 3A is a diagram illustrating an exemplary actual scene in which a preceding vehicle 2' is disposed in the vicinity of a stationary body 3 and located in front of the driver's car 1, and FIG. 3B is a diagram illustrating an exemplary detection result thereof. FIG. 4A is a diagram illustrating a map of the peak signals for the upbeat in the FM-CW mode according to FIG. 3A, and FIG. 4B is a diagram illustrating a map of the peak signals for the downbeat in the FM-CW mode according to FIG. 3A.

In the situation shown in FIG. 3A, a group 210 of beam signals 211 to 215 and a group 220 of beam signals 221 to 223 are formed in the map of the peak signals for the downbeat as shown in FIG. 4B. However, since the peak signals corresponding to the preceding vehicle 2' are covered by the wide skirt of the peak signals corresponding to the stationary body 3, only one group 230 is formed in the map of the peak signals for the upbeat as shown in FIG. 4A. These events remarkably appear in a case where the reflectivity of the stationary body 3 is large, the maximum peak signal (for example, the peak signal 213) of the peak signals corresponding to the stationary body 3 is high, the reflectivity of the preceding vehicle 2' is small due to its streamlined rear surface and the maximum peak signal (for example, the peak signal 222) of the peak signals corresponding to the preceding vehicle 2' is high.

Generally, if there is a group of peak signals for the upbeat corresponding to the maximum peak of the group 210 for the downbeat, the group 210 and the group 230 are identified as the peak signals corresponding to the stationary body, and thus excluded from the detection processes. Thus, the preceding vehicle 2' is not identified, and as shown in FIG. 3B, the preceding vehicle 2' is not detected.

SUMMARY

It is therefore an object of at least one embodiment of the present invention to provide a radar apparatus and a control method thereof which are capable of detecting peak signals corresponding to an object, which are covered by the wide skirt of peak signals corresponding to a stationary body, even when the object exists in the vicinity of the stationary body.

It is another object of at least one embodiment of the present invention to provide a radar apparatus and a control method thereof which are capable of exactly detecting peak signals, even when the peak signals for the upbeat or the downbeat are covered by the other peak signals.

According to a first aspect of at least one embodiment of the present invention, there is provided a radar apparatus comprising: an antenna which is configured to transmit a frequency-modulated transmission wave toward an object and receive a reception wave from the object; a mixer which is configured to mix the transmission wave with the reception wave to generate a beat signal having a first beat interval and a second beat interval; a detecting section which is configured to detect a plurality of first peak signals contained in the first beat interval of the beat signal and a plurality of second peak signals contained in the second beat interval; a grouping section which is configured to group the second peak signals; a searching section which is configured to search a part of the first peak signals corresponding to the grouped second peak signals; and a separating section which is configured to separate the part of the first peak signals from the other part of the first peak signals. The part of the first peak signals may include one of the first peak signals corresponding to a top peak of the grouped second peak signals and the other of the first peak signals having the same frequency as that of the one of the first peak signals. The separating section may separate the part of the first peak signals from the other part of the first peak signals based on the number of the grouped second peak signals. The separating section may separate the part of the first peak signals from the other part of the first peak signals when the number of the grouped second peak signals is different from the number of the searched part of the first peak signals. The separating section may separate the part of the first peak signals from the other part of the first peak signals based on a difference between the number of peak signals searched by the searching section and disposed at right side with respect to one of the first peak signals corresponding to a top peak of the grouped second peak signals and the number of peak signals searched by the searching section and disposed at left side with respect to the one of the first peak signals. The separating section may separate the part of the first peak signals from the other part of the first peak signals with the use of a secondary approximate curve obtained by connecting the vertexes of the part of the first peak signals. The radar apparatus may further comprise a controller including the detecting section, the grouping section, the searching section and the separating section.

According to a second aspect of at least one embodiment of the present invention there is provided a radar apparatus comprising: an antenna which is configured to transmit a frequency-modulated transmission wave toward an object and receive a reception wave from the object; a mixer which is configured to mix the transmission wave with the reception wave to generate a beat signal having a first beat interval and a second beat interval; a detecting section which is configured to detect a plurality of first peak signals contained in the first beat interval of the beat signal and a plurality of second peak signals contained in the second beat interval; a grouping section which is configured to group the second peak signals; a searching section which is configured to search one of the first peak signals, corresponding to a top peak of the grouped second peak signals and the other of the first peak signals having the same frequency as that of the one of the first peak signals; and a separating section which is configured to separate a component of the first peak signals corresponding to the grouped second peak signals from the searched first peak signals.

According to a third aspect of at least one embodiment of the present invention, there is provided a control method of a radar apparatus, comprising: transmitting a frequency-modulated transmission wave toward an object; receiving a reception wave from the object; mixing the transmission wave with the reception wave to generate a beat signal having a first beat interval and a second beat interval; detecting a plurality of first peak signals contained in the first beat interval of the beat signal and a plurality of second peak signals contained in the second beat interval; grouping the second peak signals; searching a part of the first peak signals corresponding to the grouped second peak signals; and separating the part of the first peak signals from the other part of the first peak signals.

For the oncoming vehicle, a first beat interval corresponds to the downbeat interval and a second beat interval corresponds to the upbeat interval. For the preceding vehicle, a first beat interval corresponds to the upbeat interval and a second beat interval corresponds to the downbeat interval.

According to the above radar apparatus and the above control method thereof it is possible to separate the peak signals for the downbeat which do not correspond to the peak signals for the upbeat or the peak signals for the upbeat, which do not correspond to the peak signals for the downbeat. Therefore, by separating and detecting the peak signals corresponding to an object, which are covered by the peak signals corresponding to another object, it is possible to prevent the failure to detect the object.

In particular, according to the above radar apparatus and the above control method thereof it is possible to detect the peak signal corresponding to an object, which are covered by the peak signals corresponding to a stationary body even when the object exists in the vicinity of the stationary body having a high reflectivity.

BRIEF DESCRIPTION OF THE DRAWINGS

The above objects and advantages of the present invention will become more apparent by describing in detail preferred exemplary embodiments thereof with reference to the accompanying drawings, wherein:

FIG. 1A is a diagram illustrating an exemplary actual scene where an oncoming vehicle exists in the vicinity of a stationary body;

FIG. 1B is a diagram illustrating an exemplary detection result according to the scene shown in FIG. 1A;

DETAILED DESCRIPTION OF THE EMBODIMENTS

A radar apparatus and a control method of the radar apparatus according to embodiments of the present invention will be described hereinafter with reference to accompanying drawings. The technical scope of the invention is not limited to these embodiments, and includes the invention described in Claims and equivalents thereof.

Figure 5:
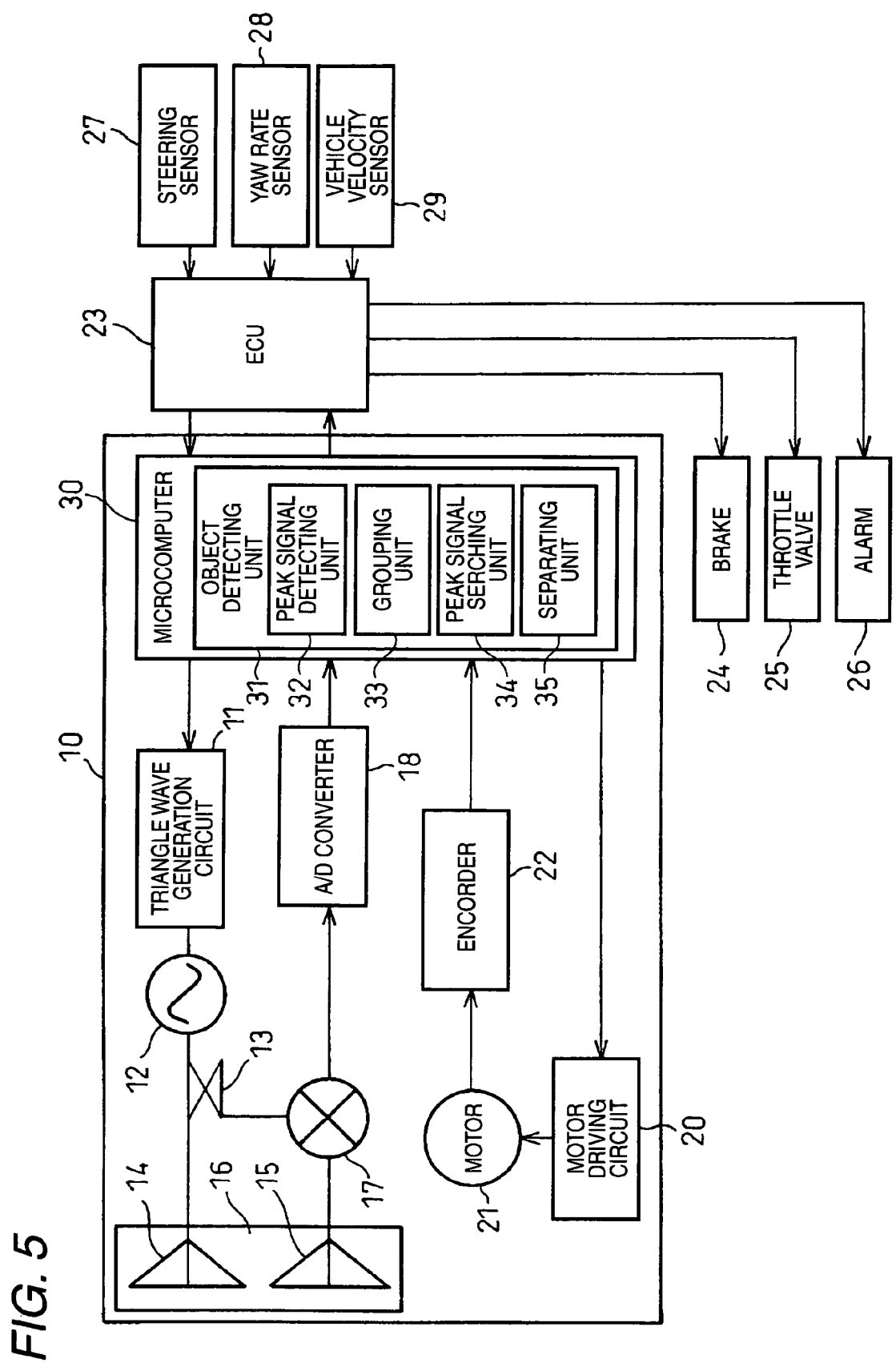
FIG. 5 is a diagram illustrating the schematic configuration of a radar apparatus according to an embodiment of the present invention.

FIG. 5 is a diagram illustrating the schematic configuration of the radar apparatus 10 according to the embodiment.

A mechanical scanning type FM-CW radar apparatus 10 shown in FIG. 5 can be mounted on the front side of the vehicle 1. A triangle wave generation circuit 11 supplies a periodic FM signal comprised of a triangle wave to a voltage controlled transmitter (VCO) 12 and a carrier wave is frequency-modulated. Then, a radio wave (millimeter wave) is transmitted as a transmission wave to a transmission antenna 14 and a mixer 17 via a directional coupler 13. The transmission antenna 14 transmits the transmission wave ahead of the vehicle. The transmission wave is reflected from an object located ahead of the vehicle 1 as a reflection wave and a receive antenna 15 receives the reflection wave. The mixer mixes the transmission wave with the reflection wave to obtain a beat signal.

The beat signal is A/D-converted by an A/D converter 18 and input to a microcomputer 30. The microcomputer 30 includes a CPU, a ROM, a RAM, and an object detecting unit 31 which detects the object and calculates a distance and a relative velocity between the vehicle 1 and the detected object based on the beat signal.

The object detecting unit 31 includes at least a peak signal detecting unit 32, a grouping unit 33, a peak signal searching unit 34, and a separating unit 35. The peak signal detecting unit 32 can detect peak signals for the upbeat and the downbeat. The grouping unit 33 can group peak signals which have the approximately-same frequency. The peak signal searching unit 34 can search peak signals corresponding to a predetermined condition. The separating unit 35 can separate peak signals corresponding to the object to be detected, which are covered by the wide skirt of the peak signals corresponding to another object. The object detecting unit 31, the peak signal detecting unit 32, the grouping unit 33, the peak signal searching unit 34 and the separating unit 35 are mounted on the microcomputer 30 as hardware and/or software.

A steering sensor 27 can detect a steering angle of a steering wheel mounted on the vehicle 1. A yaw rate sensor 28 can detect a rotating velocity of the vehicle 1. A vehicle velocity sensor 29 can detect a vehicle velocity of the vehicle 1. An ECU (Electronic Control Device) 23 for the vehicle control can receive information from the steering sensor 27, the yaw rate sensor 28 and the vehicle velocity sensor 29. The ECU 23 controls a brake 24, a throttle valve 25 and a horn 26 mounted on the vehicle 1, based on the information sent from the sensors 27, 28, 29 and the distance and the relative velocity between the vehicle 1 and the object, transmitted from the microcomputer 30. For example, when the distance between the vehicle 1 and the object become smaller than a predetermined value, the ECU 23 operates the brake 24 and blows the horn 26. When the distance between the vehicle 1 and the object become greater than the predetermined value, the ECU 23 opens the throttle valve 25.

The transmission antenna 14 and the receive antenna 15 are integrally formed with an antenna element 16 which is comprised of plane lenses and reflecting mirrors. In the mechanical scanning, it is necessary to horizontally swing these antennas to perform the detection process at a predetermined angle range in front of the vehicle. Therefore, the mechanical scanning type radar apparatus 10 includes a motor 21, a motor driving circuit 20 and an encoder 22. The motor driving circuit 20 can drive the motor 21. The motor 20 can swing the transmission antenna 14 and the receive antenna 15 horizontally based on a signal received from the microcomputer 30. For example, these antennas 14, 15 are simultaneously operated to cover an angle range from 8° left to 8° right, i.e. 16° in total. The encoder can receive a signal from the motor 21 and transmits the signal to the microcomputer 30 to perform feed back operation of the motor 21.

Next, the principle of the object detection in the FM-CW mode will be described herein below.

Figure 6A:
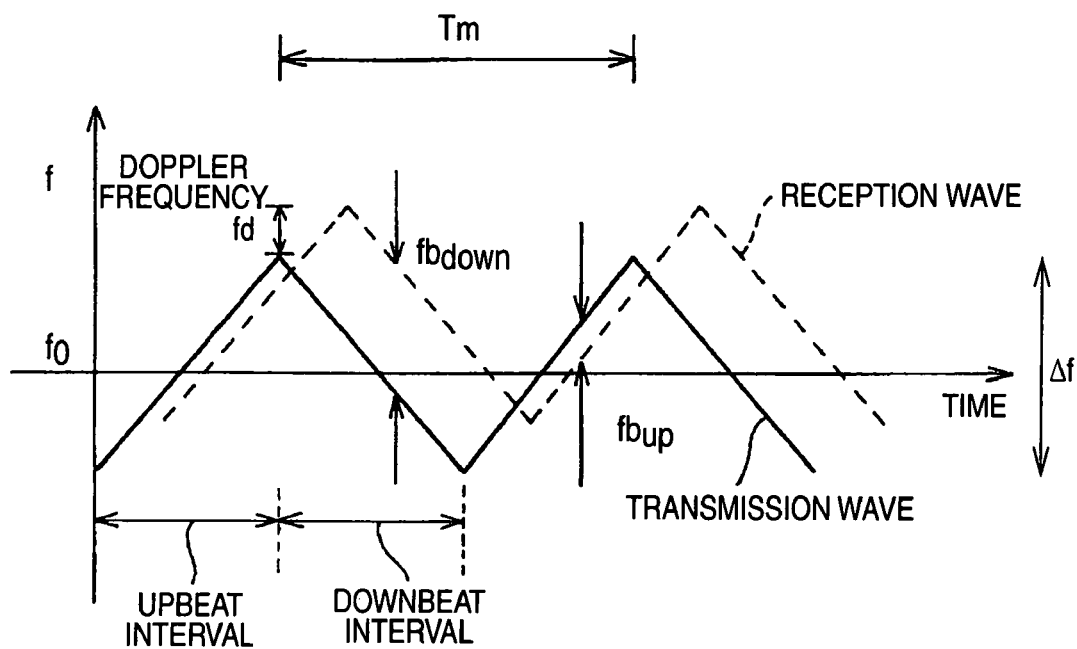
FIG. 6A is a diagram illustrating a relationship between the time and the frequency of the transmission wave and the reception wave according to the embodiment.
Figure 6B:
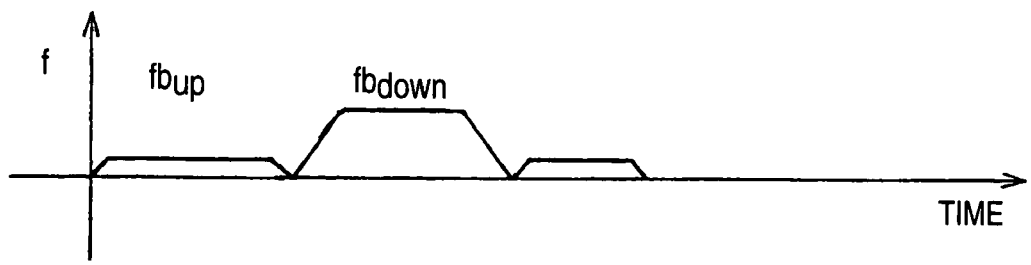
FIG. 6B is a diagram illustrating a relationship between the time and the frequency of a beat signal according to the embodiment.

FIG. 6A is a diagram illustrating a relationship between the time and the frequency of the transmission wave and the reception wave; and FIG. 6B is a diagram illustrating a relationship between the time and the frequency of a beat signal.

In FIG. 6A, a triangle wave with a solid line denotes the frequency of the transmission wave. The center frequency of the transmission wave is f0, the FM modulation width is $\Delta F$, and the repetition period is Tm. As shown in FIG. 5, this transmission wave is transmitted to the object, reflected from the object and received by the receive antenna 15 as the reception wave (reflection wave). A triangle wave with a broken line denotes the frequency of the reception wave. As shown in FIG. 6A, the transmission wave and the reception wave are shifted with each other due to the flight time from the transmission to the reception. In addition, as shown in FIG. 6A, the center frequency of the reception wave is shifted from the center frequency of the transmission wave in accordance with the distance between the vehicle 1 and the object to be detected. This shift (deviation) of the frequency is referred to as beat. When the object is moving, the frequency of the received signal is shifted due to Doppler Effect.

The beat signal of the transmission wave and the reception wave for each upbeat interval in which the triangle wave rises up and downbeat interval in which the triangle wave falls down are illustrated in FIG. 6B. The frequency of the beat signal is obtained by overlapping the frequency of the beat signal fr for the stationary object with the Doppler frequency fd.

The frequency fbup of the beat signal for the upbeat interval and the frequency fbdown of the beat signal for the downbeat interval may be expressed by following equations (1) and (2).

$$fbup = fr - fd \quad (1)$$

$$fbdown = fr + fd \quad (2)$$

The relationship between Doppler frequency fd and the velocity V may be expressed by a following equation (3).

$$fd = 2 \cdot V \cdot f0/c \quad (3)$$

The frequency deviation fr caused by the flight time can be calculated by a subtraction operation between fbup and fbdown, the shift (deviation) fd due to the Doppler shift can be calculated by an additional operation between fbup and fbdown, and the distance the relative velocity can be obtained by multiplying the fr and fd by an constant. That is, fr and fd may be expressed by following equations (4) and (5), respectively.

$$fr = (fbup - fbdown)/2 \quad (4)$$

$$fd = (fbup + fbdown)/2 \quad (5)$$

Therefore, if both fbup and fbdown are obtained for the same object, the fr and fd can be calculated and the distance, and thus the relative velocity between the vehicle and the object can be calculated. If the relative velocity with respect to the object is 0, the frequency fbup of the beat signal for the upbeat interval is equal to the frequency fbdown of the beat signal for the downbeat interval.

Power (Electric power) can be obtained by sampling and Fourier-transforming the beat signals for respective intervals.

When a plurality of objects exist ahead of the vehicle, each object reflects the respective beams and thus a plurality of peak frequencies exists for the upbeat and the downbeat with respect to one object. The microcomputer 30 groups the peak signals having the (approximately) same frequency into one or more groups centered on a peak signal with the highest peak (i.e., a peak signal with the highest power) the from among a plurality of the peak frequencies for respective upbeat and downbeat. Thereafter, the microcomputer 30 pairs a group for the upbeat and a group for the downbeat, calculates the distance between the vehicle and the object by summing the frequencies of the beat signals of the two paired groups, and calculates the relative velocity with respect to the object by subtracting the frequencies of the beat signals of the two paired groups.

Figure 7:
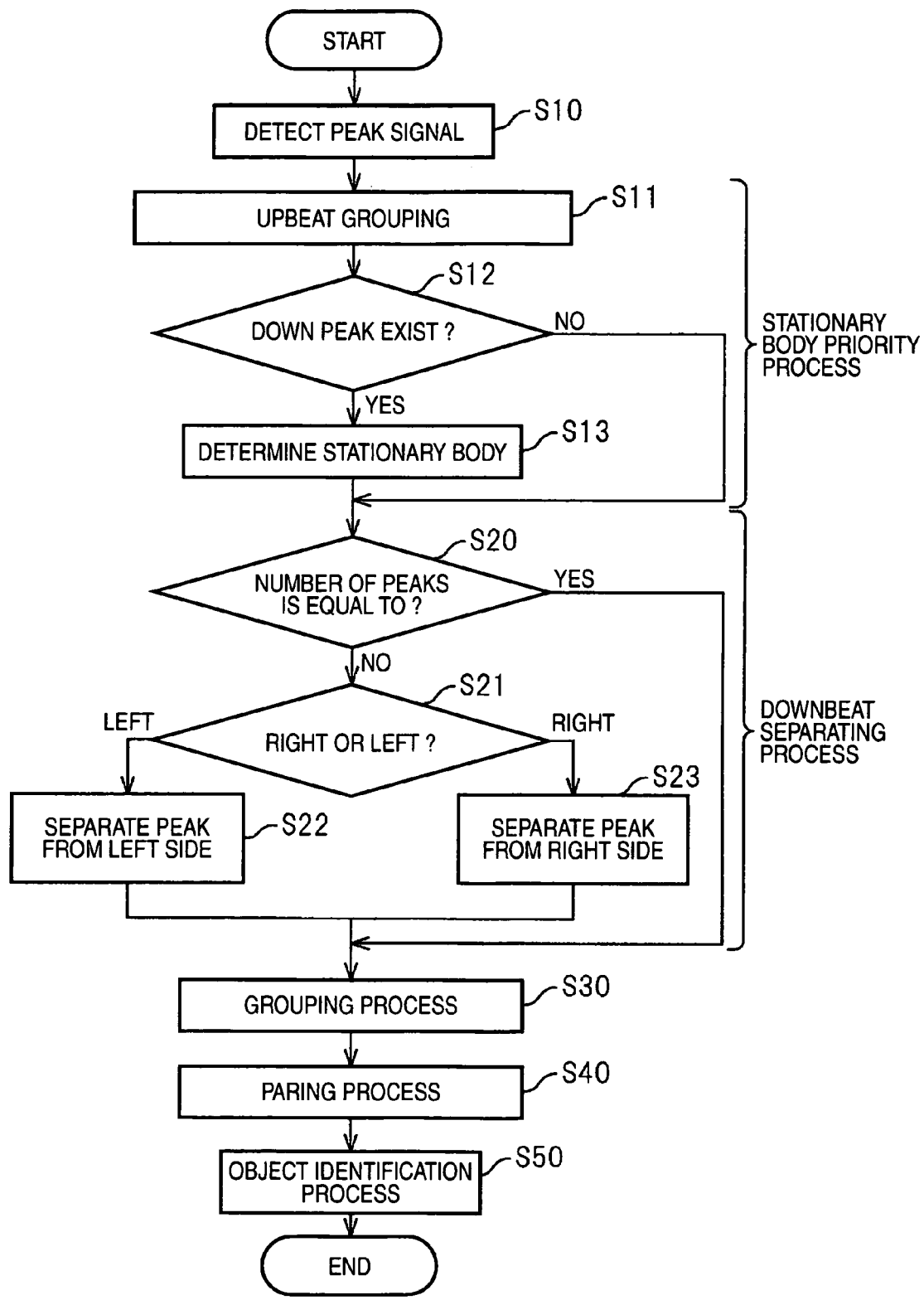
FIG. 7 is a flowchart illustrating a process for detecting the object under the situation of FIG. 1A according to the embodiment.

FIG. 7 is a flowchart illustrating a process for detecting the object under the situation of FIG. 1A.

The process shown in FIG. 7 is executed by the CPU of the microcomputer 30 in cooperation with the respective elements of the radar apparatus 10 such as the ECU 23 shown in FIG. 5, in accordance with the programs previously stored in the storage device such as the ROM of the microcomputer 30. In this embodiment, it is assumed that the vehicle 1 on which the radar apparatus 10 is mounted is under the situation similar to that of FIG. 1A.

First, the transmission antenna 14 transmits 16 beam signals in an angle range from 8° left to 8° right when the front face of the vehicle 1 is 0°, i.e. in the angle range of 16° in total at a regular angle interval of 1°. Then, in this angle range, the microcomputer 30 (the peak signal detecting unit 32) detects the peak signals for the upbeat and the downbeat (S10) as shown in FIGS. 8A and 8B.

Figure 8A:
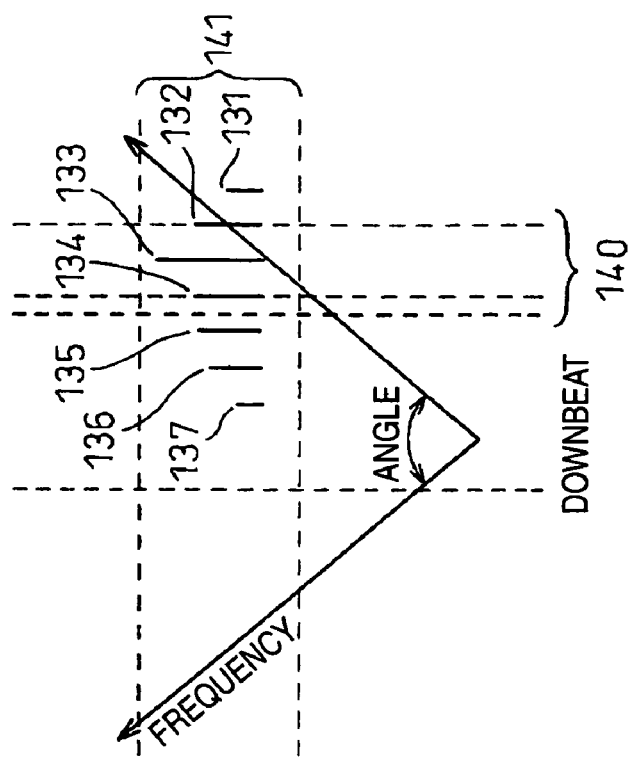
FIG. 8A is a diagram illustrating an exemplary map of the peak signals for the upbeat in the FM-CW mode according to the embodiment.
Figure 8B:
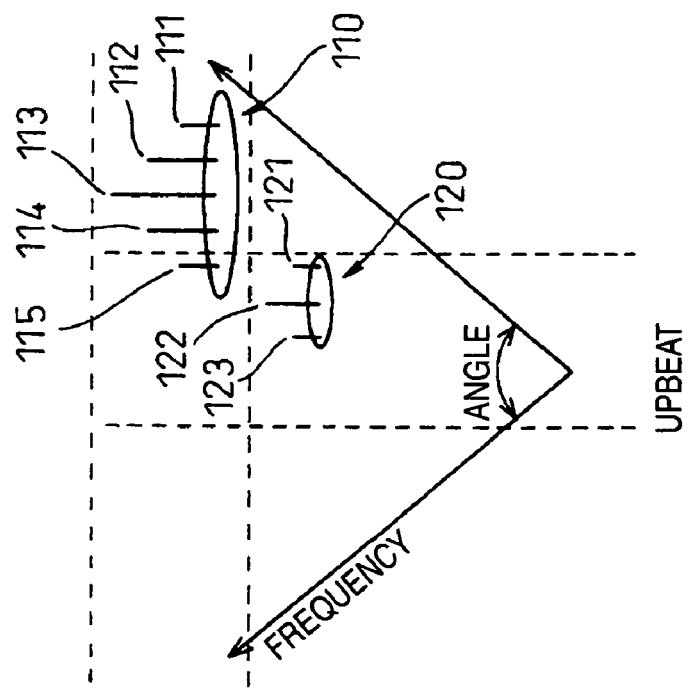
FIG. 8B is a diagram illustrating an exemplary map of the peak signals for the downbeat in the FM-CW mode according to the embodiment.

FIG. 8A is a diagram illustrating an exemplary map of the peak signals for the upbeat. FIG. 8B is a diagram illustrating an exemplary map of the peak signals for the downbeat. In FIGS. 8A and 8B, the outgoing direction from the antenna is denoted as the frequency, and the angle of the beam signals emitted from the antenna is denoted as the angle.

Then, the microcomputer 30 (the grouping unit 33) groups the peak signals for the upbeat (S11).

The microcomputer 30 (the grouping unit 33) groups the peak signals having the approximate same frequency. Specifically, as shown in FIG. 8A, the peak signals 121 to 123 are set as the group 110 and the peak signals 111 to 115 are set as the group 120. In this case, the peak signal 113 which has the highest power in the peak signals of the group 110 is referred to as a top peak of the group 110, and the peak signal 122 which has the highest power in the peak signals of the group 120 is referred to as a top peak of the group 120.

Subsequently, the microcomputer 30 (the peak signal searching unit 34) determines whether or not a peak signal exists at the position shifted by the Doppler frequency of the vehicle velocity of the vehicle velocity of the vehicle 1 within the range of ±1 beam from the top peak of the each group in the peak signals for the downbeat (S12).

At S12, if a peak signal exists, the microcomputer 30 determines that the stationary body exists (S13). Otherwise, if a peak signal does not exist, the microcomputer 30 determines that a stationary body does not exist and then the step proceeds to S30. S11 to S13 are steps corresponding to a stationary body priority process.

For example, referring to the group 110 shown in FIG. 8A, the peak signal 133 is detected in the map shown in FIG. 8B by determining whether a peak signal exists or not in the range 140 of ±1 beam from the beam in which the top peak 113 is detected and in the range (frequency band) 141 shifted from the same frequency as that of the peak signals 111 to 115 contained in the group 110 by the Doppler frequency of the velocity of the vehicle 1. Thus, the microcomputer 30 can preferentially determine that the group 110 is a signal corresponding to a stationary body. When the peak signal 133 is detected, the microcomputer 30 (the searching unit 34) further searches the peak signals each of which has a frequency equal to or within a predetermined frequency range from that of the searched peak signal 133 from the map shown in FIG. 8B.

If the stationary body determination process is performed at S13, the microcomputer 30 (the separating unit 35) determines whether the number of the peak signals within the group of the peak signals for the upbeat is equal to the number of the peak signals each of which has a frequency equal to or within a predetermined frequency range (for example, within error limits) from that of the peak signal 133 detected at S12 (S20). At S20, if the two numbers of the peak signals are equal to each other, the microcomputer 30 determines that the covered peak signals do not exist, and if the two numbers of the peak signals are different from each other, the microcomputer 30 determines that covered peak signals exist.

Subsequently, the microcomputer 30 (the separating unit 35) detects the numbers of both left and right peak signals with respect to the peak signal 133 which is detected at S12 in the peak signals 131 to 137 each of which has a frequency equal to or within a predetermined range from that of the peak signal 133 detected at S12. Then the microcomputer 30 determines that peak signals are covered in one side (left side or right side) having the number greater than that of the other side (left side or right side) (S21).

Subsequently, if the microcomputer 30 (the separating unit 35) determines the left side at S21, the microcomputer 30 (the separating unit 35) separates the covered peak signals from the peak signals disposed at the left side with respect to the peak signal 133 (S22). Otherwise, if the microcomputer 30 (the separating unit 35) determines the right side at S21, the microcomputer 30 (the separating unit 35) separates the covered peak signals from the peak signals disposed at the right side with respect to the peak signal 133 (S23). The process of separating the covered peak signals will be described later. S20 to S23 are steps corresponding to a separating process for the downbeat.

For example, as shown in FIGS. 5A and 8B, the number of the peak signals contained in the group 110 for the upbeat is 5 whereas the number of the peak signals 131 to 137 each of which has a frequency equal to or within a predetermined range from the frequency of the peak signal 133 which is detected at S12 is 7. The numbers of the peak signals are not equal to each other. Accordingly, the process proceeds to S21. Since 2 peak signals (i.e. the peak signals 131 and 132) are disposed at the right side with respect to the peak signal 133 and 3 peak signals (i.e. the peak signals 135 to 137) are disposed at the left side with respect to the peak signal 133, the process proceeds to S22. Then the peak signals are separated from the left side at S22.

Figure 9A:
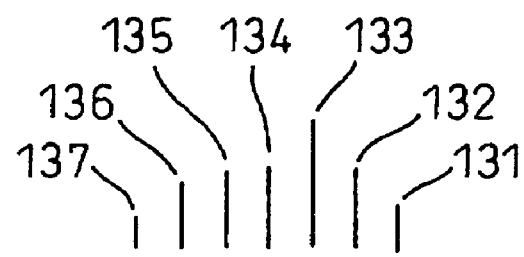
FIGS. 9A to 9C are diagrams for explaining a separating process of the peak signals.
Figure 9B:
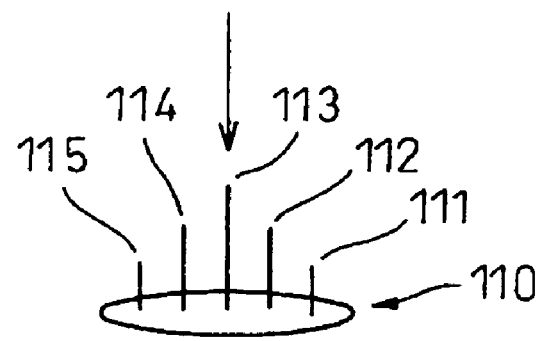
Figure 9C:
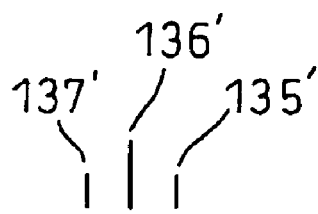

FIGS. 9A and 9C are diagrams for explaining a method of separating the peak signals.

FIG. 9A illustrates 7 peak signals 131 to 137 each of which has a frequency equal to or within a predetermined range from that of the peak signal 133 detected at S12 of FIG. 7 and shown in FIG. 8B. FIG. 9B illustrates the peak signals 111 to 115 contained in the group 110 shown in FIG. 8A. And FIG. 9C illustrates the peak signals separated from the 7 peak signals shown in FIG. 9A.

According to the separation method shown in FIGS. 9A to 9C, the microcomputer 30 (the separating unit 35) separates the peak signals shown in FIG. 9C, by coinciding the beam position of the top peak 113 contained in the group 110 with the beam position of the peak signal 133 detected at S12 and obtaining the difference between the 5 peak signals shown in FIG. 9B and the 7 peak signals shown in FIG. 9A. Accordingly, the 5 peak signals shown in FIG. 9B, which correspond to the stationary body are removed from the 7 peak signals shown in FIG. 9A. It is possible to obtain the peak signals 135', 136' and 137' covered by the wide skirt of the 7 peak signals shown in FIG. 9A.

Subsequently, the microcomputer 30 (the object detecting unit 31) performs a grouping process for the upbeat and the downbeat (S30). In this process, the microcomputer 30 considers only the peak signals 135', 136' and 137' separated at S22 or S23. That is, the microcomputer 30 does not consider the peak signals 111 to 115 contained in the group 110 for the upbeat, which are determined as being associated with the stationary body (see FIG. 8A) and the peak signals 131 to 137 each of which has a frequency equal to or within a predetermined range from that of the peak signal 133 detected at S12 of FIG. 7 in the grouping process.

Figure 10B:
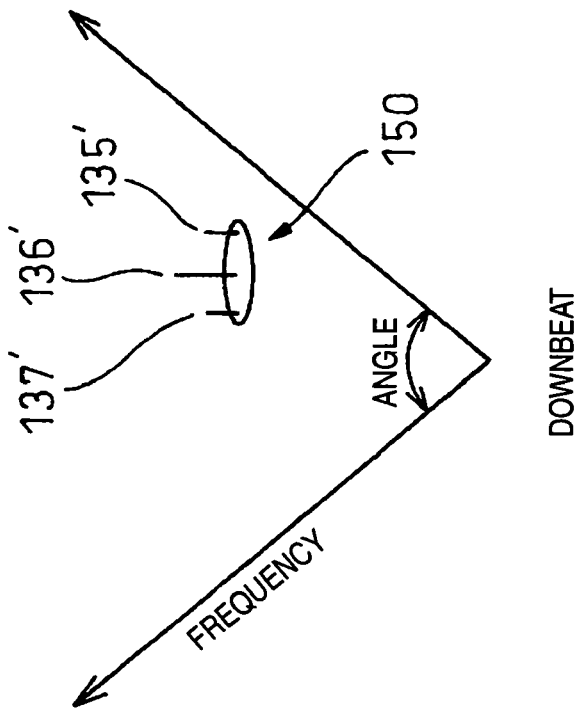
FIGS. 10A and 10B are diagrams illustrating an example where the grouping of the peak signals is performed after the separation of the peak signals according to the embodiment.
Figure 10A:
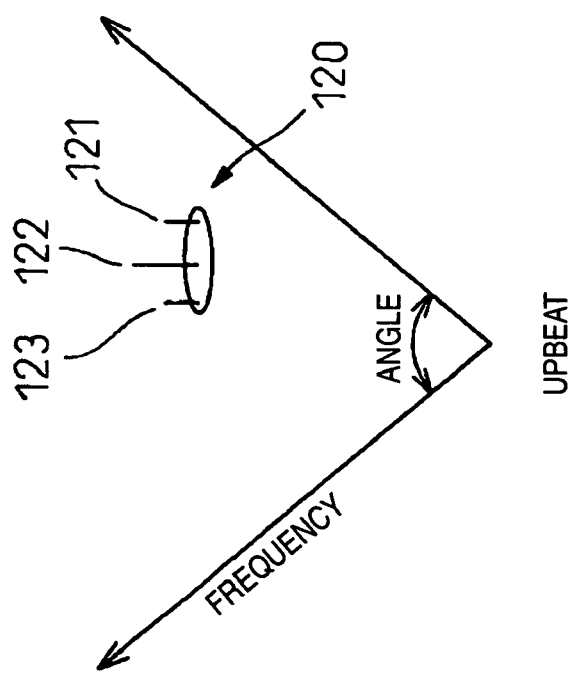

FIGS. 10A and 10B are diagrams illustrating an example where the grouping of the peak signals is performed after the separation of the peak signals. FIG. 10A illustrates a map of the peak signals for the upbeat. FIG. 10B illustrate a map of the peak signals for the downbeat. In FIGS. 10A and 10B, the outgoing direction from the antenna is denoted as the frequency, and the angle of the beam signals emitted form the antenna is denoted as the angle.

Similarly to FIG. 8A, in FIG. 10B, the peak signals 135' to 137' separated at FIG. 9C are set as the group 150, and in FIG. 10B, the peak signals 121 to 123 are set as the group 120.

Subsequently, the microcomputer 30 (the object detecting unit 31) performs the pairing process (S40) to paring the two groups. The microcomputer 30 (the object detecting unit 31) performs the object identification process (S50) to calculate the distance to the object based on the sum of the beat signal frequencies of the two paired groups, and the relative velocity with respect to the object based on the difference between the beat signal frequencies of the two paired groups. And then, the microcomputer finishes the process. According to the example of FIGS. 10A and 10B, the group 120 and the group 150 are paired with each other in the paring process and the distance between the vehicle and the object is calculated based on the sum of the frequencies of the beat signals in the group 120 and the group 150 and the relative velocity with respect to the object can be calculated based on the difference between the frequencies of the beat signals in the object identification process.

The radar apparatus 10 according to the embodiment can identify that the groups 120 and 150 are the peak signals associated with the oncoming vehicle, by the object identification process (S50). Thus, contrary to the example shown in FIG. 1B, even when the oncoming vehicle exists in the vicinity of the stationary body having high reflectivity, the object can be accurately identified and detected.

Figure 11A:
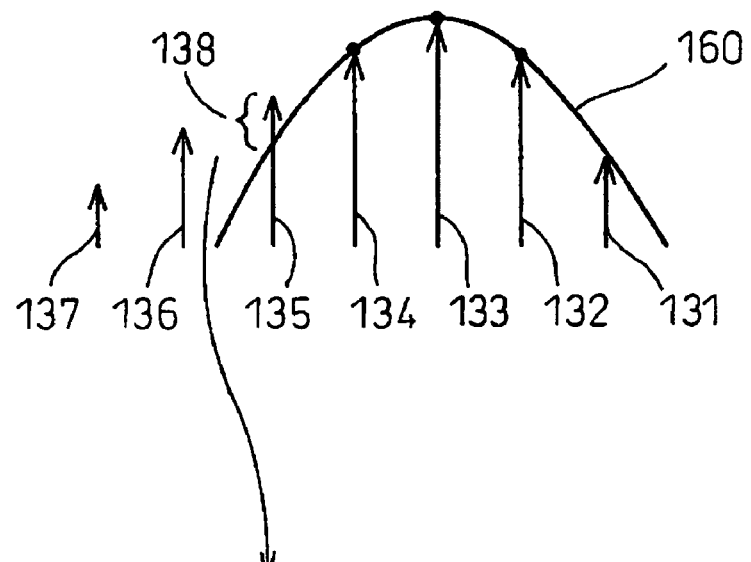
FIGS. 11A and 11B are diagrams for explaining another separating process of the peak signals.
Figure 11B:
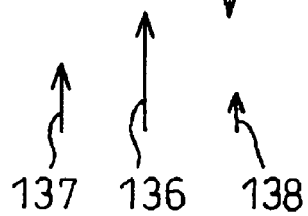

FIGS. 11A and 11B are diagrams for explaining another method of separating the peak signals.

FIG. 11A illustrates 7 peak signals 131 to 137 each of which has a frequency equal to or within a predetermined range from that of the peak signal 133 detected at S12 of FIG. 7 and shown in FIG. 8B. FIG. 11B illustrates the remaining peak signals after the separating process performed in FIG. 11A.

In FIG. 11A, a secondary approximate curve 160 obtained by connecting 3 vertexes, i.e., the vertex of the peak signal 133 with the highest power in the 7 peak signals 131 to 137, and the vertexes of the peak signals 132 and 134 positioned at both sides of the peak signal 133, is calculated. Then the peak signals corresponding to the portion beyond the secondary approximate curve 160 are separated.

In FIG. 11A, since the peak signals 136 and 137 and a part of the peak signal 135 exceed the secondary approximate curve 160, the peak signals 136 and 137 and the portion 138 which exceeds the secondary approximate curve 160 are separated (see, FIG. 11B).

This separation process shown in FIG. 11 can be used instead of the peak separation process for the downbeat (S20 to S23) shown in FIG. 7.

Figure 2B:
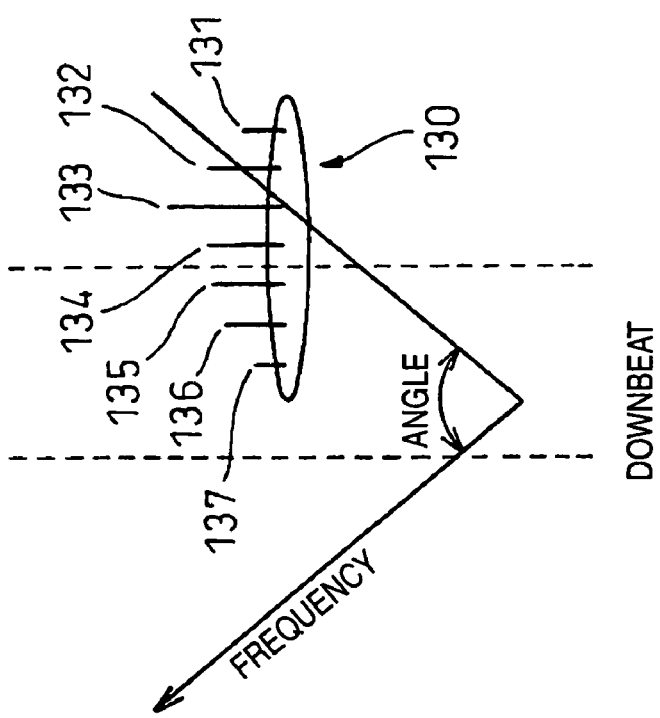
FIG. 2B is a diagram illustrating an exemplary map of the peak signals for the downbeat in the FM-CW mode according to the scene shown in FIG. 1A.
Figure 2A:
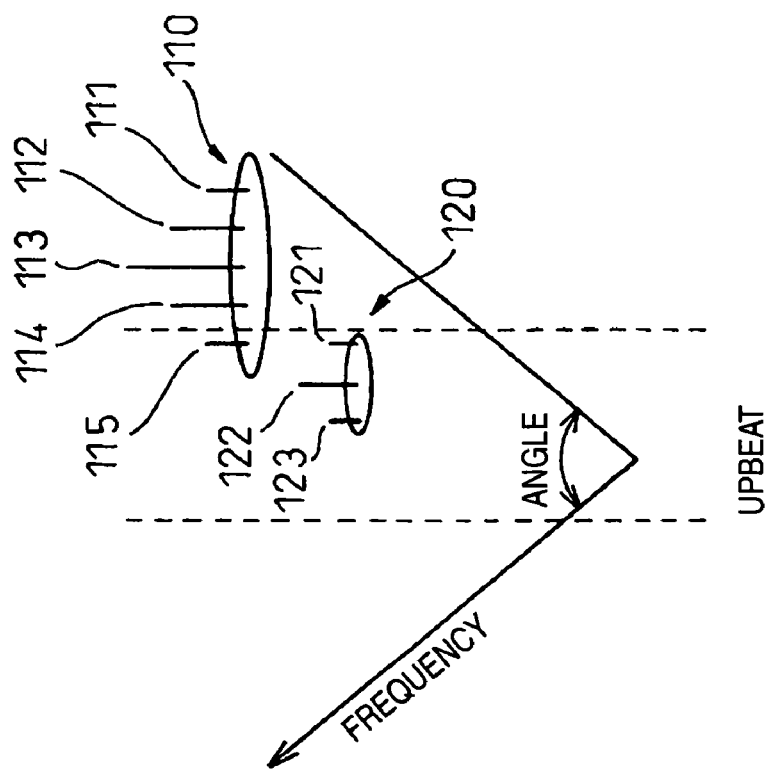
FIG. 2A is a diagram illustrating an exemplary map of the peak signals for the upbeat in the FM-CW mode according to the scene shown in FIG. 1A.
Figure 3B:
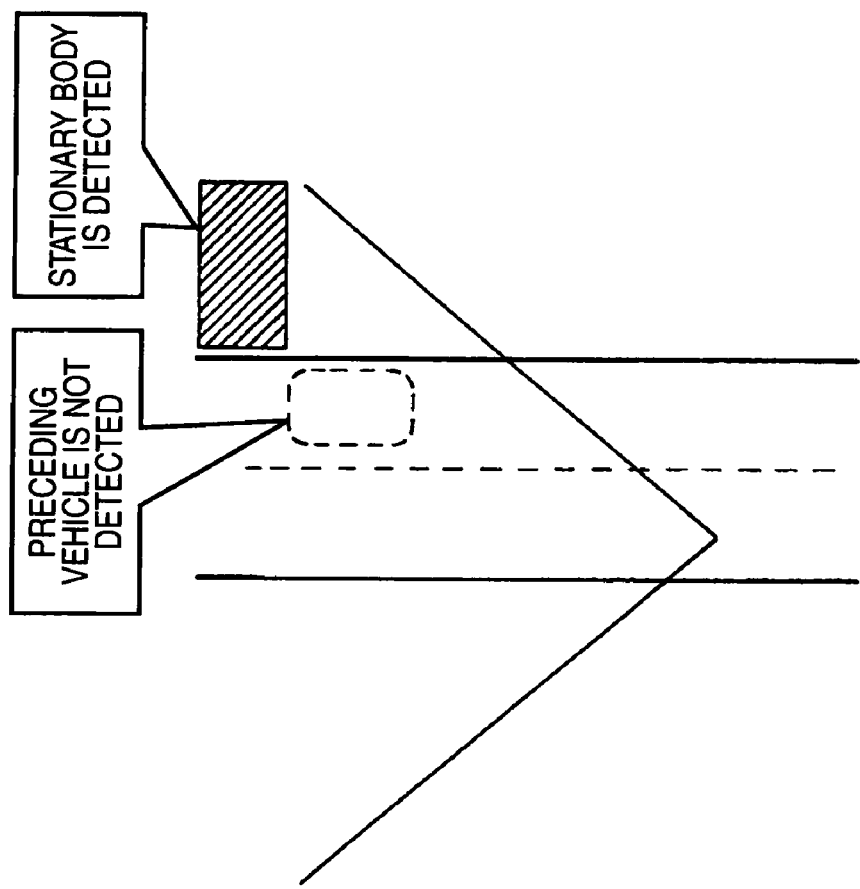
FIG. 3B is a diagram illustrating an exemplary detection result according to the scene shown in FIG. 3A.
Figure 3A:
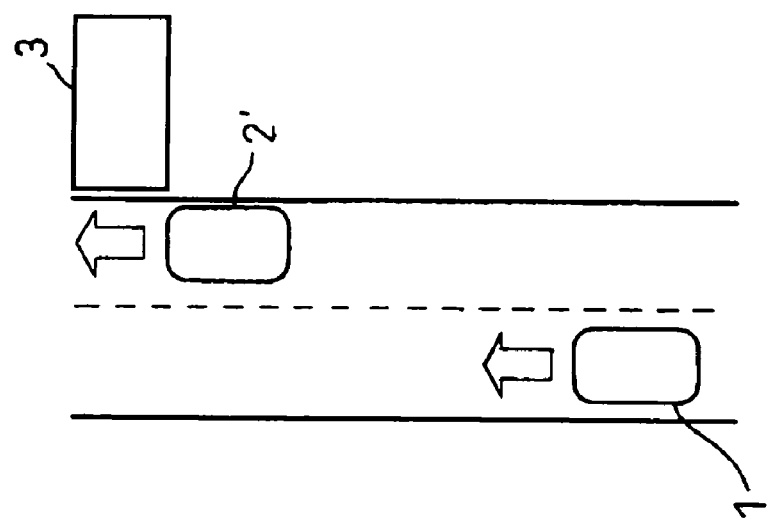
FIG. 3A is a diagram illustrating an exemplary actual scene where an preceding vehicle exists in the vicinity of a stationary body.
Figure 12:
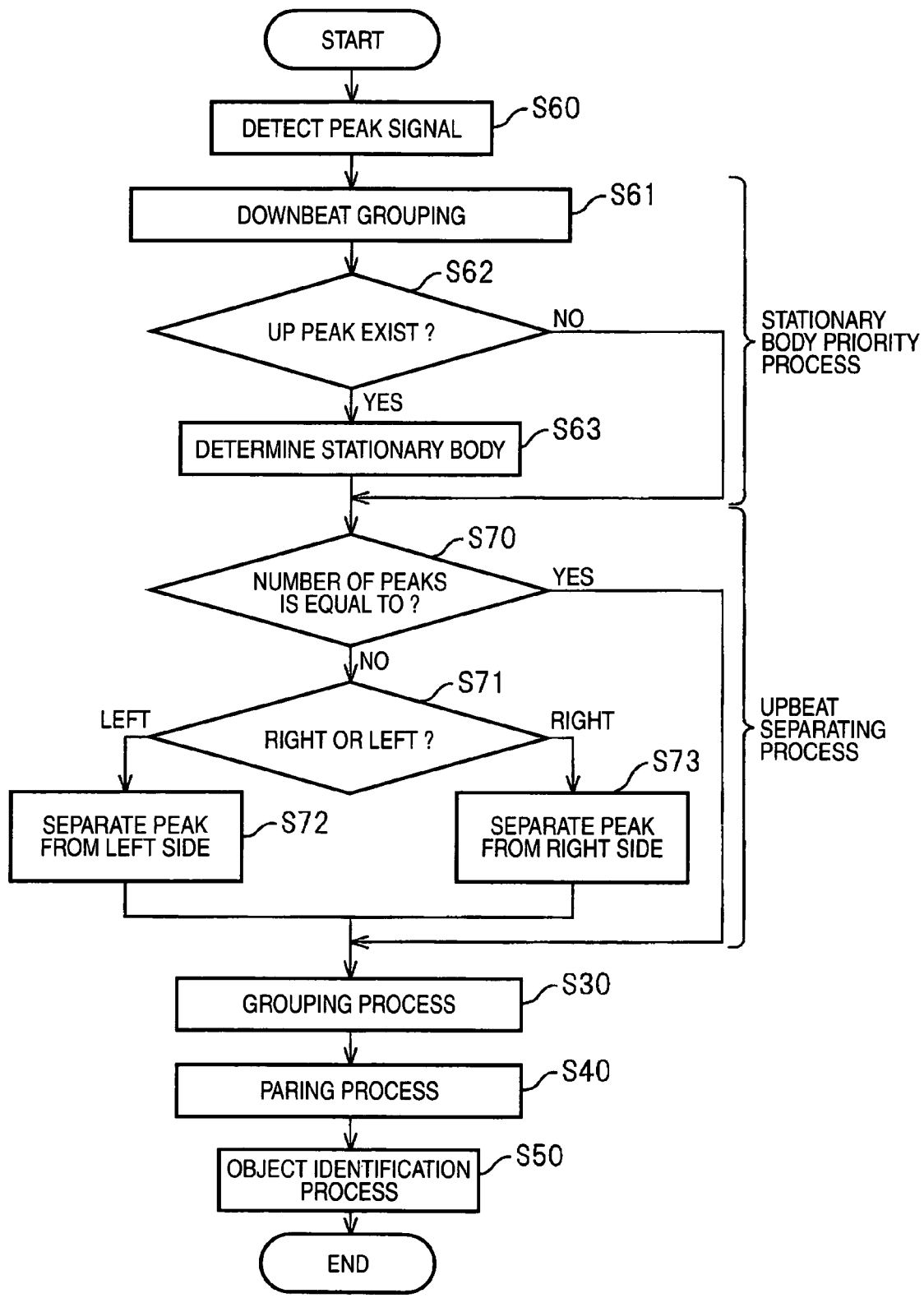
FIG. 12 is a flowchart illustrating a detection process for detecting the object under the situation of FIG. 3A according to the embodiment.

FIG. 12 is a flowchart illustrating a process for detecting the object under the situation of FIG. 3A.

The process shown in FIG. 12 is executed by the CPU of the microcomputer 30 in cooperation with the respective elements of the radar apparatus 10 such as the ECU 23 shown in FIG. 5, in accordance with the programs previously stored in the storage device such as the ROM of the microcomputer 30. In this embodiment, it is assumed that the vehicle 1 on which the radar apparatus 10 is mounted is under the situation similar to that of FIG. 3A.

First, the transmission antenna 14 transmits 16 beam signals in an angle range from 8° left to 8° right when the front face of the vehicle 1 is 0°, i.e. in the angle range of 16° in total at a regular angle interval of 1°. Then, in this angle range, the microcomputer 30 (the peak signal detecting unit 32) detects the peak signals for the upbeat and the downbeat (S60).

Thereafter, the microcomputer 30 (the grouping unit 33) groups the peak signals for the downbeat (S61).

Figure 4B:
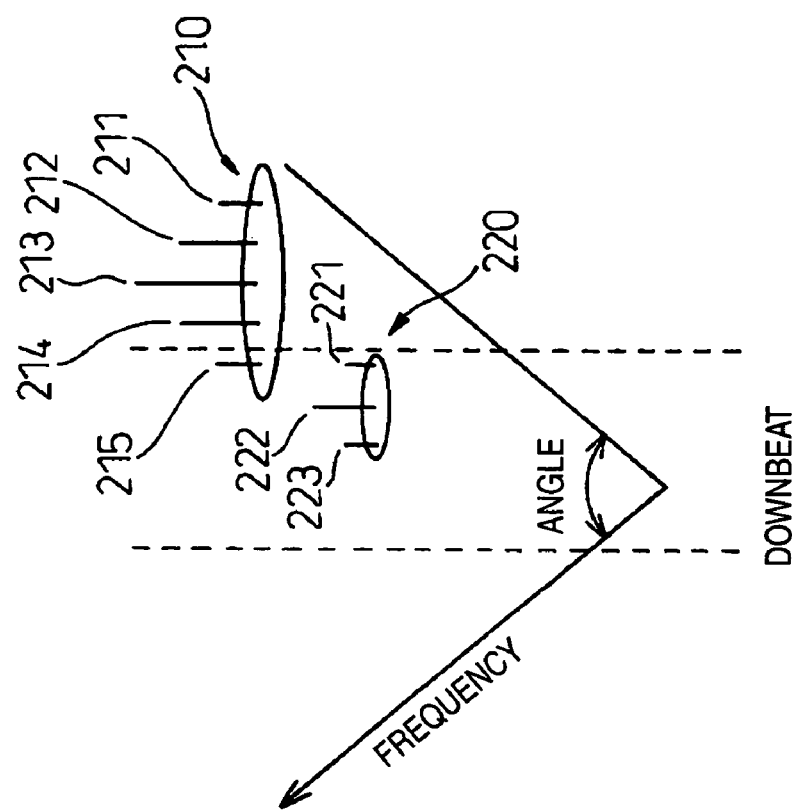
FIG. 4B is a diagram illustrating an exemplary map of the peak signals for the downbeat in the FM-CW mode according to the scene shown in FIG. 3A.

The microcomputer 30 (the grouping unit 33) groups the peak signals having the approximate same frequency. Specifically, as shown in FIG. 4B, the peak signals 211 to 215 are set as the group 210, and the peak signals 221 to 223 are set as the group 220. In this case, the peak signal 213 which has the highest power in the peak signals of the group 210 is referred to as a top peak of the group 210, and the peak signal 222 which has the highest power in the peak signals of the group 220 is referred to as a top peak of the group 220.

Subsequently, the microcomputer 30 (the peak signal searching unit 34) determines whether or not a peak signal exists at the position shifted by the Doppler frequency of the vehicle velocity of the vehicle 1 within the range of ±1 beam from the top peak of the each groups in the peak signals for the upbeat (S62).

At S62, if a peak signal exists, the microcomputer 30 determines that a stationary body exists (S63). Otherwise, if a peak signal does not exist, the microcomputer 30 determines that no stationary body exists and then the step proceeds to S70. S61 to S63 are steps corresponding to a stationary body priority process. For example, the peak signal 233 for the upbeat is detected in the map shown in FIG. 4A.

If the stationary body determination process is performed at S63, the microcomputer 30 (the separating unit 35) determines whether the number of the peak signals within the group of the peak signals for the downbeat is equal to the number of the peak signals each of which has a frequency equal to or within a predetermined frequency range from that of the peak signal 233 detected at S62 (S70). At S70, if the two numbers of the peak signals are equal to each other, the microcomputer 30 determines that the covered peak signals do not exist, and if the two numbers of the peak signals are different from each other, the microcomputer 30 determines that covered peak signals exist.

Subsequently, the microcomputer 30 (the separating unit 35) detects the numbers of both left and right peak signals with respect to the peak signal 233 which is detected at S62 in the peak signals 231 to 237 each of which has a frequency equal to or within a predetermined frequency range from that of the peak signal 233 detected at S62. Then the microcomputer 30 determines that peak signals are covered in one side (left side or right side) having the number greater than that of the other side (left side or right side) (S71).

Subsequently, if the microcomputer 30 (the separating unit 35) determines the left side at S71, the microcomputer 30 (the separating unit 35) separates the covered peak signals from the peak signals disposed at the left side with respect to the peak signal 233 (S72). Otherwise, if the microcomputer 30 (the separating unit 35) determines the right side at S72, the microcomputer 30 (the separating unit 35) separates the covered peak signals from the peak signals disposed at the right side with respect to the peak signal 233 (S73). The processes of separating the covered peak signals are described above. S70 to S73 are steps corresponding to a separating process for the upbeat.

Figure 4A:
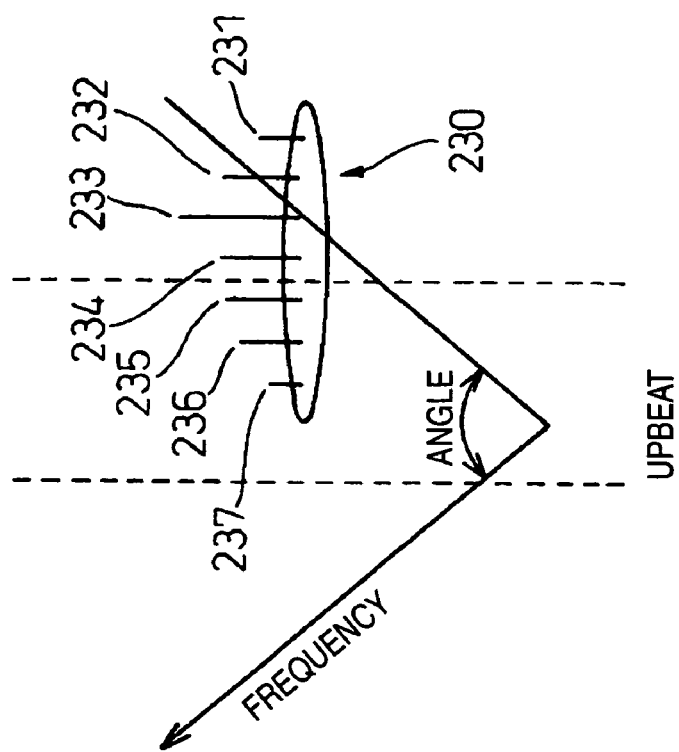
FIG. 4A is a diagram illustrating an exemplary map of the peak signals for the upbeat in the FM-CW mode according to the scene shown in FIG. 3A.

For example, as shown in FIGS. 4A and 4B, the number of the peak signals contained in the group 210 for the downbeat is 5 whereas the number of the peak signals 231 to 237 each of which has a frequency equal to or within a predetermined range from the frequency of the peak signal 233 which is detected at S62 is 7. The numbered of the peak signals are not equal to each other. Accordingly, the process proceeds to S71. Since 2 peak signals (i.e. the peak signals 231 and 232) are disposed at the right side with respect to the peak signal 233 and 3 peak signals (i.e. the peak signals 235 to 237) are disposed at the left side with respect to the peak signal 233, the process proceeds to S72. Then, the peak signals are separated from the left side at S72.

Since the grouping process (S30), the pairing process (S40) and the object identification process (S50) are similar to corresponding processes shown in FIG. 7, descriptions thereof will be omitted. Thus, contrary to the example shown in FIG. 3B, even when the preceding vehicle exists in the vicinity of the stationary body having high reflectivity, since the peak signals corresponding to the preceding vehicle can be identified with the use of the process shown in FIG. 12, the object can be accurately identified and detected. The separation process shown in FIG. 11 can be used instead of the peak separation process for the upbeat (S70 to S73) shown in FIG. 12.

In the above described embodiment, the radar apparatus is installed in the front of the vehicle 1. However, the invention is also applicable even when the radar apparatus is installed in any other positions, for example in the rear or side of the vehicle 1.

In the above described embodiments, the searching unit 34 searches the peak signals corresponding to the group 110 for the upbeat from the detected peak signals for the downbeat or searches the peak signals corresponding to the group 210 for the downbeat from the detected peak signals for the upbeat. And then the separating unit 35 extracts a component of the searched peak signals, which are to be separated to separate the extracted component from the other components of the searched peak signals. However, the invention is also applicable even when the peak signal searching unit 34 searches the peak signals corresponding to the group 110 for the upbeat or the group 210 for the downbeat and extracts a component of the searched peak signals, which are to be separated. In this case, the separating unit 35 merely separates the extracted component from the other components of the searched peak signals without performing the extraction process shown in FIGS. 9A to 9C and FIGS. 11A and 11B.

What is claimed is:

1. A radar apparatus comprising:
   an antenna that is configured to transmit a frequency-modulated transmission wave toward an object and receive a reception wave from the object;
   a mixer that is configured to mix the transmission wave with the reception wave to generate a beat signal having a first beat interval and a second beat interval;
   a detecting section that is configured to detect a plurality of first peak signals contained in the first beat interval of the beat signal and a plurality of second peak signals contained in the second beat interval of the beat signal;
   a grouping section that is configured to group the plurality of second peak signals;
   a searching section that is configured to search a part of the plurality of first peak signals corresponding to the grouped second peak signals; and
   a separating section that is configured to separate the part of the first peak signals corresponding to the grouped second peak signals from a remaining part of the first peak signals,
   wherein the separating section separates the part of the first peak signals from the remaining part of the first peak signals based on a difference between the number of peak signals searched by the searching section and disposed at a right side with respect to one of the first peak signals corresponding to a top peak of the grouped second peak signals and the number of peak signals searched by the searching section and disposed at a left side with respect to the one of the first peak signals.

2. The radar apparatus according to claim 1, further comprising a controller including the detecting section, the grouping section, the searching section and the separating section.

3. A radar apparatus comprising:

an antenna that is configured to transmit a frequency-modulated transmission wave toward an object and receive a reception wave from the object;

a mixer that is configured to mix the transmission wave with the reception wave to generate a beat signal having a first beat interval and a second beat interval;

a detecting section that is configured to detect a plurality of first peak signals contained in the first beat interval of the beat signal and a plurality of second peak signals contained in the second beat interval of the beat signal;

a grouping section that is configured to group the plurality of second peak signals;

a searching section that is configured to search a part of the plurality of first peak signals corresponding to the grouped second peak signals; and a separating section that is configured to separate the part of the first peak signals corresponding to the grouped second peak signals from a remaining part of the first peak signals wherein the separating section separates the part of the first peak signals from the remaining part of the first peak signals with the use of a secondary approximate curve obtained by connecting the vertexes of the part of the first peak signals, and wherein one or more parts of the plurality of the first peak signals that exceed the secondary approximate curve are separated.

4. A control method of a radar apparatus, comprising:

transmitting a frequency-modulated transmission wave toward an object;

receiving a reception wave from the object;

mixing the transmission wave with the reception wave to generate a beat signal having a first beat interval and a second beat interval;

detecting a plurality of first peak signals contained in the first beat interval of the beat signal and a plurality of second peak signals contained in the second beat interval of the beat signal;

grouping the second peak signals;

searching a part of the plurality of first peak signals corresponding to the grouped second peak signals; and separating the part of the plurality of first peak signals from a remaining part of the plurality of first peak signals, wherein the separating separates the part of the first peak signals from the remaining part of the first peak signals based on a difference between the number of peak signals searched by the searching and disposed at a right side with respect to one of the first peak signals corresponding to a top peak of the grouped second peak signals and the number of peak signals searched by the searching section and disposed at a left side with respect to the one of the first peak signals.

* * * * *